United States Patent [19]

Phiet

[11] Patent Number: 4,644,530
[45] Date of Patent: Feb. 17, 1987

[54] INSTANT SPEAKER ALGORITHM FOR DIGITAL CONFERENCE BRIDGE

[75] Inventor: Do Q. Phiet, Mulgrave, Australia

[73] Assignee: Australian Telecommunications Commission, Melbourne, Australia

[21] Appl. No.: 775,549

[22] Filed: Sep. 13, 1985

[51] Int. Cl.$^4$ ............................................. H04Q 11/04
[52] U.S. Cl. ........................................ 370/62; 379/202
[58] Field of Search .......... 370/62; 179/18 BC, 2 TV

[56] References Cited

U.S. PATENT DOCUMENTS

| | | | |
|---|---|---|---|
| 4,031,328 | 6/1977 | Pitroda ................................. | 370/62 |
| 4,175,215 | 11/1979 | McLaughlin et al. ................ | 370/62 |
| 4,387,457 | 6/1983 | Münter ................................. | 370/62 |
| 4,495,616 | 1/1985 | Shuh ................................... | 370/62 |

*Primary Examiner*—Douglas W. Olms
*Assistant Examiner*—Wellington Chin
*Attorney, Agent, or Firm*—Sughrue, Mion, Zinn, Macpeak & Seas

[57] ABSTRACT

Digital conference bridge for use with a plurality of telephones (#1 ... #n) and arranged whereby in accordance with predetermined output conditions from the telephones, as existing from time to time during use of the telephones for communication therebetween, the output signal from one telephone is directed to the remainder of the telephones and the output signals of the remainder are suppressed. The bridge generates products $x_n \cdot g_n$ and $x_i \cdot g_i$ where $x_n$ and $x_i$ are instantaneous magnitudes of samples of all of the signals and of the selected signal respectively, and $g_n$ and $g_i$ are predetermined gain factors for all of the signals and for the selected signal respectively. A register (60) storing the value of "i", designating the presently selected telephone, is updated by a circuit including comparators (42,52) connected to a gate (44) whereby to surplant a selection of an existing value of "i" by a new value under the following conditions:

$$x_n \cdot g_n > x_i \cdot g_i, \text{ and}$$

$$x_n \cdot g_n > T \cdot g_n.$$

One of the comparators (42) is arranged to compare the last held values $x_i \cdot g_i$ as stored in a register (40) with the incoming products $x_n \cdot g_n$, to determine whether the first of these conditions prevails and the second comparator (52) is arranged to compare the incoming product $x_n \cdot g_n$ with the product $T \cdot g_n$ to determine whether the second of these conditions prevails. The value "T" represents a threshold value stored in the threshold register (48). The bridge is arranged to replace a threshold "T" as stored in the threshold register (48) by a new value equal to $x_i \cdot g_i$ in the event that a product $x_i \cdot g_i$ should exceed the existing value of "T". The bridge is also arranged to decrement the threshold value "T" by a predetermined amount in the event that the threshold value "T" should exceed one or a plurality of successive products $x_i \cdot g_i$.

6 Claims, 3 Drawing Figures

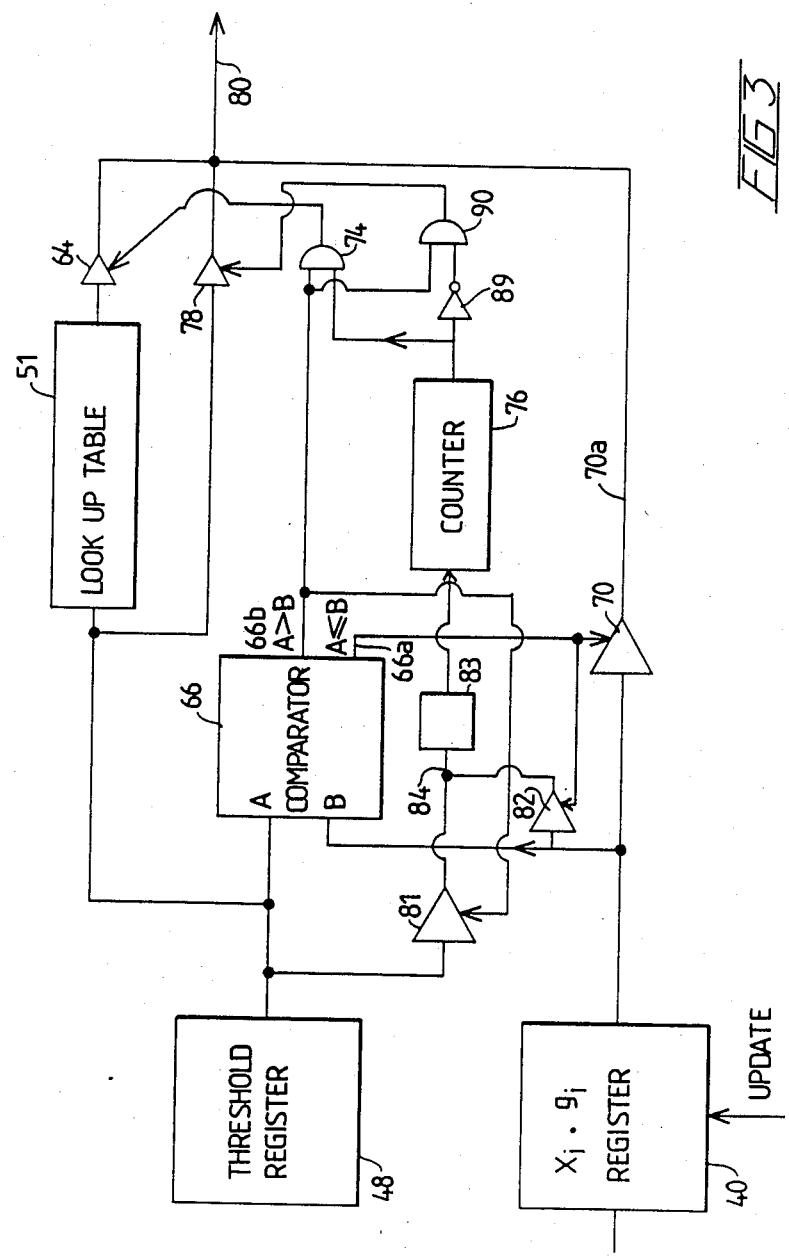

INSTANT SPEAKER ALGORITHM FOR DIGITAL CONFERENCE BRIDGE

BACKGROUND OF THE INVENTION (i) Field of the Invention

This invention relates to a conference bridge.

(ii) Prior Art

Difficulties arise in communications networks, such as telephone networks, designed to permit multiple interconnections between a number of communications devices, such as where a number of telephones are to be interconnected for the purpose of permitting users to conduct a conference during which each speaker may speak and be heard as the occasion requires. In principle, without consideration of practical transmission performance limitations, if the telephones are analogue devices with two wire links therebetween, it is possible to interconnect a number of telephones for conference type calls provided the interconnection routes between the telephones are also two wire links. Where, however, four wire links are employed, such as where the signals are digitally encoded at some point in the communications circuit, an equivalent technique of direct multiple interconnection is not possible and arrangements must be made for switching the incoming and outgoing signals from each telephone in such a fashion as to direct the signals between telephones in a way which will permit intelligible communication. To separate incoming and outgoing signals from each two wire telephone link, a hybrid is used to convert two wire to four wire links. It is known to digitise the outgoing signals from each of the telephones and, by using a suitable switch, to block outgoing calls from all but one selected one of the telephones from reaching the remainder whilst directing the outgoing signal from the selected telephone to the remainder. Various means have been proposed to control such a switch. U.S. Pat. Nos. 3,958,084 and 3,947,639 describe an arrangement in which the determination of which telephone is to be selected for the time being as providing the outcoming signal to the remaining telephones is made in accordance with a comparison of the instantaneous magnitude of the signal from the last selected telephone with the magnitude of signals from the remaining telephones and operating to replace the prevailing selection by another in the event that certain conditions are fulfilled. More particularly, the conditions are if the instantaneous magnitude of a non-selected signal is greater than the corresponding instantaneous magnitude of the signal from the prevailing selection, and if that greater instantaneous magnitude is also greater than a predetermined threshold value. In the arrangement of these patents, an arrangement is provided for varying the threshold under certain conditions. More particularly, the threshold is determined as representing peak amplitudes of the signal from the selected telephone but, manipulation is made to decrease the threshold stepwise in the event that fresh samples of the selected signal fall below the preceding threshold. Thus, in the event that the selected signal output should fail to reach the threshold level for a succession of sampling intervals, the threshold will eventually reach a zero state unless supplanted by a threshold derived from a supplanting signal. This has the effect that it is relatively more difficult for a selected signal to be supplanted where other of the signals are of larger magnitude but are possible echoes in their local hybrids, whilst still permitting a relatively free transition to another selected signal in the case where the earlier selected signal has, say, fallen to zero for an acceptable interval.

A difficulty arises, however, in implementing devices as described above, called conference bridges, in that the signal levels from each of the telephones may not reach the bridge with equal signal levels for equal sound input to the respective telephones. This phenomena arises, for example, where there are differences in the links interconnecting the telephones with the bridge such as due to different line lengths or line characteristics. In this case, it will be seen that unless adjustments are made to the signal levels, improper operation may occur since a signal from a particular telephone which exhibits, naturally, a greater signal level than those from other telephones would tend to take precedence even where this was not desired.

An object of the present invention is to at least in part alleviate the above mentioned difficulty.

BRIEF DESCRIPTION OF THE INVENTION

In accordance with one aspect of the invention there is provided a digital conference bridge whereby output signals from a plurality of communications devices can be controlled whereby the output signal from a selected one of the devices is directed to the remainder, the signal for the time being so selected being determined by selection means incorporated into said bridge and receiving time spaced digitised samples at least representing said signals, characterised in that said selection means comprises first generating means for generating the products $x_n \cdot g_n$, $x_i \cdot g_i$ where $x_n$ and $x_i$ are instantaneous magnitudes of the samples of all of the signals, and of the selected signal respectively and $g_n$ and $g_i$ are predetermined gain factors for all of the signals and for the selected signal respectively; first store means for storing a threshold value "T"; first comparator means for comparing the products $x_n \cdot g_n$ with the product $x_i \cdot g_i$; switch means for routing the selected signal to each non-selected communications device; and control means responsive to the conditions $x_n \cdot g_n > x_i \cdot g_i$ and $x_n \cdot g_n > \cdot g_n$ to control said switch means to supplant a selection of an existing said signal with a newly selected signal in accordance with that one of the previously non-selected signals which meets said conditions.

In this arrangement, the selection means may further include updating means for updating said first store means, including a second comparator means for comparing a presently stored threshold value T in said threshold register with products $x_i \cdot g_i$ and means for supplanting the existing threshold value by a new value equal to $x_i \cdot g_i$ in the event that a product $x_i \cdot g_i$ should exceed the existing threshold value, said updating means further including decrementing means coupled to said comparator for decrementing said threshold value T by a predetermined amount in the event that the threshold value T should exceed one or a plurality of successive products $x_i \cdot g_i$.

BRIEF DESCRIPTION OF THE SEVERAL VIEWS OF THE ACCOMPANYING DRAWINGS

The invention is further described by way of example only with reference to the accompanying drawings in which:

FIG. 3 is a circuit diagram of a further part of a conference bridge constructed in accordance with the invention.

DETAILED DESCRIPTION

Figure 1:
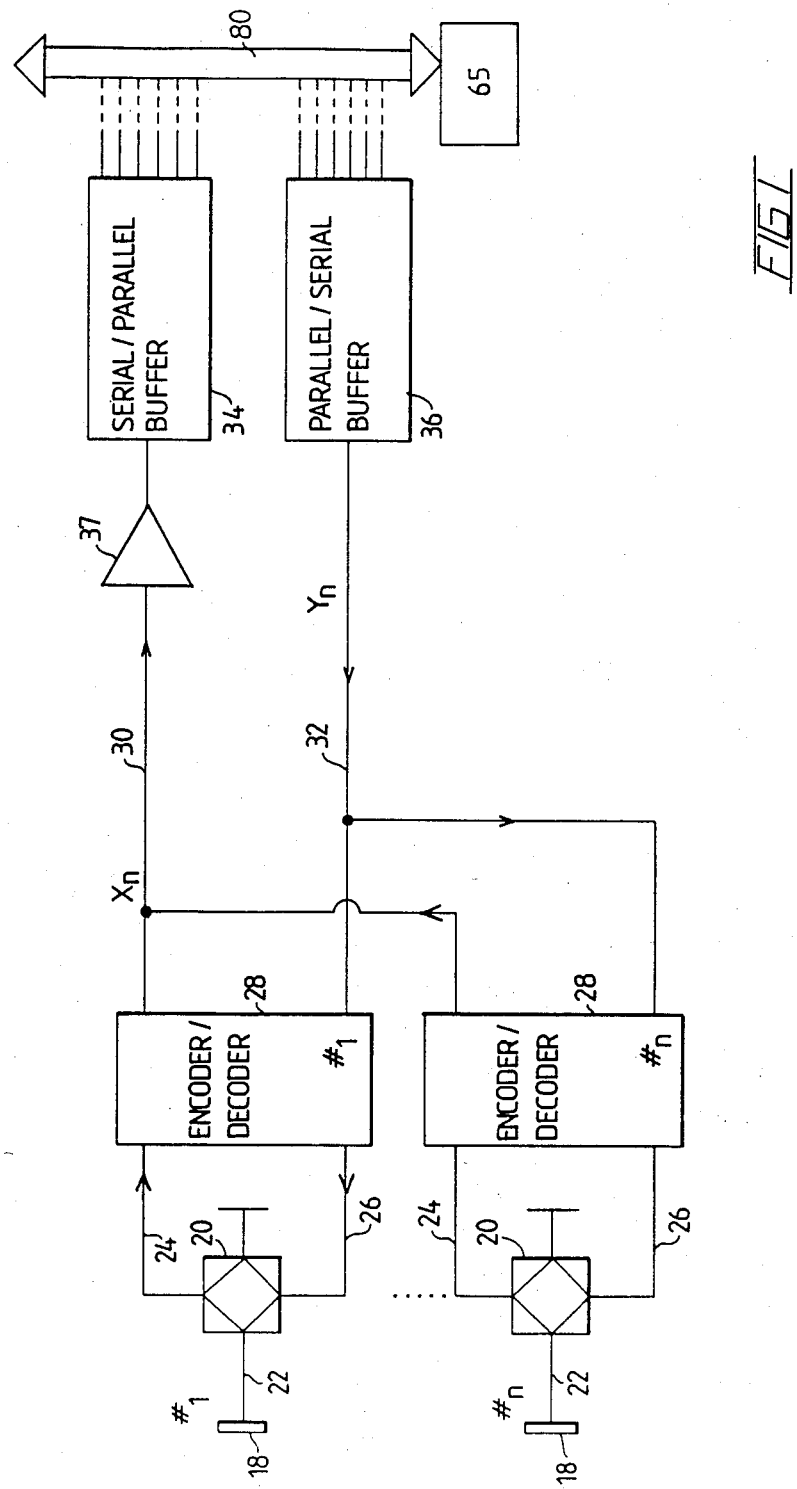
FIG. 1 is a diagram showing the interconnection of telephones in a conferencing network, through encoding devices to buffers.

FIG. 1 shows a telephone hook-up arrangement intended to be used in conjunction with a conference bridge constructed in accordance with the invention In FIG. 1, two telephones designated #1 and #n as shown, being the first and nth respectively of a series of such telephones, the intervening members of the series of telephones being omitted for clarity. Each telephone #1 through #n is connected to a respective hybrid 20. Each hybrid 20 has an input-output port coupled by a two wire link 22 to a respective telephone, an outgoing port coupled to an outgoing line 24 for directing outgoing signal on line 22 from the hybrid and an incoming port connected to an incoming signal line 26 for receiving incoming signal and directing it from the hybrid to the line 22. Lines 24, 26 associated with a hybrid 20 are connected to a respective digital encoder/decoder device 28. Devices 28 operate at a high sampling rate such as 8 Khz. The devices 28 are in turn connected to respective PCM highways 30, 32. Highway 30 in use carries thereon pulse-code modulated time-division multiplexed signals from the encoders/decoder devices 28 and connects to a serial to parallel buffer 34 via a gain control device 37. Highway 32 in use receives time division multiplexed pulse-code modulated signals from a parallel to serial buffer 36 for direction to the encoder/coder device 28. As in accordance with conventional practice in pulse-code modulated time-division multi-plexed communications arrangements, the coder/decoder device 28 operate to generate digitised signals from the respective telephones 18 and hybrids 20 and to appropriately position them in successive time windows forming, for each set of windows corresponding to a set of digitised signals a respective time frame, for data transmission on the highway 30 and likewise to receive and decode the respective correspondingly positioned signals on highway 32, to direct signals to appropriate ones of the hybrids 20 and telephones 18.

The gain control device 37 is operative to multiply digitised samples signal $x_n$, corresponding to respective ones of the telephones 18 by predetermined gain factors $g_n$ the gain factor being capable of being different for each signal $x_n$. The device may comprise a digital multiplier suitably programmed and capable of being programmed in a predetermined fashion such that, for constant sound levels at each telephone 18 as provided by a speaker thereat, products $x_n \cdot g_n$ will be the same for signals derived from each of the telephones 18. There will of course be a set of products $x_n \cdot g_n$ for each set of digitised sample signals from the telephones 18.

Figure 2:
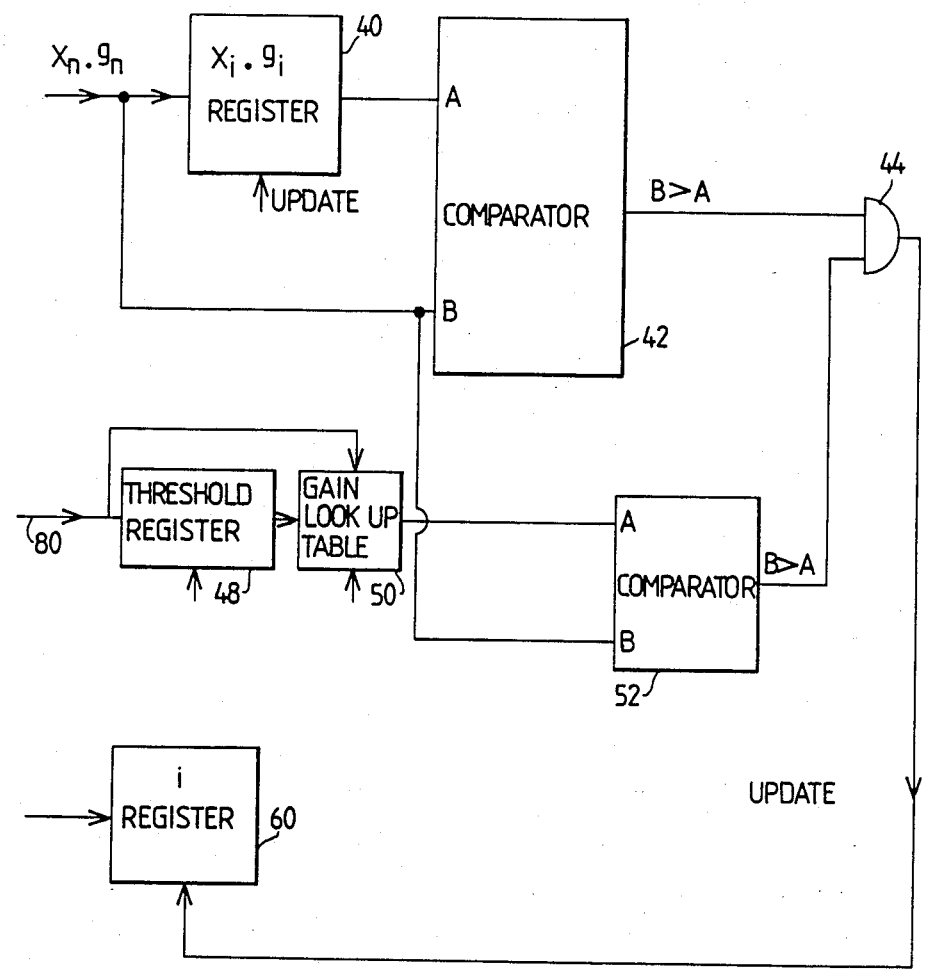
FIG. 2 is a diagram of part of a conference bridge constructed in accordance with the invention.

The buffers 34, 36 and the device 37 form part of conference bridge, which bridge includes further components as shown in FIGS. 2 and 3.

FIG. 2 shows a register 40 for storing a product $x_i \cdot g_i$ this corresponding to a predetermined one of the set of products $x_n \cdot g_n$. Register 40 is updated each time a new set of signals representing products $x_n \cdot g_n$ is received, the signal "i" selected to have the product $x_n \cdot g_n$ corresponding thereto stored being determined in accordance with the particular telephone 18 which is for the time being selected as one from which output signal is to be directed to all of the remaining telephones. Thus, for example, if telephone #3 is to be so selected "i" will have the value 3.

The value of "i" for the preceding set of products $x_n \cdot g_n$ is stored in a register 60. When the new set of products $x_n \cdot g_n$ is received, it is the product $x_i \cdot g_i$ from that set which is stored in register 40, where the value of "i" is that prevailing from the selection made from the preceding set of products.

The now stored value $x_i \cdot g_i$ in register 40 is applied to one input of a comparator 42 the other input of which comparator receives the signals representing products $x_n \cdot g_n$. Comparator 42 is operable to compare, for each set of products $x_n \cdot g_n$, the now stored product $x_i \cdot g_i$ in store 40 with the current set of products $x_n \cdot g_n$. The comparator 42 has its output connected to an AND gate 44.

FIG. 2 also shows a threshold register 48 having a stored threshold value "T" therein. Register 48 is connected to a gain adjusting device 50, (such as a gain look-up table) and the output therefrom is connected to one input of a second comparator 52. The other output of comparator 52 receives the products $x_n \cdot g_n$. Comparator 52 operates to compare the product $T \cdot g_n$ and $x_n \cdot g_n$ where T is the stored value in the register 48. Output from comparator 52 is coupled to AND gate 44.

In the event that output from comparator 42 should be indicative of the condition that a product $x_n \cdot g_n$ is greater than a product $x_i \cdot g_i$ stored in register 40 the output of the comparator 42 will be enabled. Similarly, the output of comparator 52 will be enabled in the event that the product $x_n \cdot g_n$ is greater than the product $T \cdot g_i$ derived from the threshold register and gain look-up table 50.

In the event that output of both of the comparators 42 and 52 should be enabled, the output from gate 44 is enabled. Gate 44 has its output connected to a register 60 for storing the value of "i", the identification of the particular telephone for the time being to be the telephone from which signal is to be directed to the remaining telephones. Enabling of the output of gate 44 causes updating of the register 60 to record the identity of "i" derived from the corresponding set of products $x_n \cdot g_n$. Register 60 is able to identify the selected telephone on the basis that the enabling of the output of gate 44 will occur at a time period during the relevant PCM frame indicative of a particular telephone. Register 40 is coupled to register 60 so that register 40 can be conditioned for each time frame to store the selected product $x_i \cdot g_i$ as before described. The whole of the described updating function in respect of register 60 may be effected under control of microprocessor 65, which microprocessor may also be employed for outputting of the products $x_n \cdot g_n$ to the circuit of FIG. 2

The actual switching of signal as between telephones 18, once "i" has been identified, is effected by a microprocessor 65 which is coupled to the register 60 and which is also coupled to the buffers 34, 36 which act as controllable switches for directing the signal from the telephone identified in accordance with the last selection of "i" to the remaining telephone. More particularly, the microprocessor 65 is coupled to a bus 80 to which the buffers 34, 36 are likewise connected, for the transfer of signals between buffers under control of the microprocessor.

In FIG. 3, which shows a further part of the bridge, the means for updating the register 48 is shown. Here, the register 48 is shown connected to a tristate 78 which can be enabled to permit the value T stored in register 48 to be outputted as required to a data bus 80, which bus 80 communicates inter alia with device 50. The register 40 is also shown, together with a comparator 66 which receives the output from the register 48 and from the register 40. Comparator 66 operates during each PCM time frame to compare the threshold value T stored in register 48 with the last stored product $x_i \cdot g_i$ in register 40. In the event that the stored threshold value T in register 48 is equal to or less than the product $x_i \cdot g_i$, one output 66a of the comparator 66 is enabled. This output is connected to a tristate 70 and is arranged such that the tristate 70 is enabled in this condition. The tristate is coupled to the register 40 so that when enabled it provides the product $x_i \cdot g_i$ (from the register 40) on an output line 70a therefrom to data bus 80. Bus 80 provides a connection to the microprocessor 65 which updates register 48 by substituting the so outputted product $x_i \cdot g_i$ for the previous threshold value T.

In the event that the pre-existing threshold T, exceeds the stored product $x_i \cdot g_i$, an output 66b of comparator 66 is enabled. This output is connected to one input of each of two AND gates 74 and 90. The other input of gate 74 is connected to the output of a counter 76. The other input of gate 90 is connected via an inverter 89 to the output of counter 76. The input of counter 76 is selectively couplable to threshold register 48 and to register 90 in a manner described later. When a carry over of the contents of the counter 76 occurs the output from the counter is enabled and, on simultaneous enabling of output 66b, gate 74 is enabled and gate 90 is disabled. Enabling of gate 74 disenables tristate 78 and enables a further tristate 64. Tristate 64 then provides a connection from the output of register 48, through a table look-up device 51 to bus 80. Device 51 is constructed so as to operate on the digital signal applied thereto, representing the threshold value T stored in register 48, to decrement the value represented thereby (such as by digital "1") so that a new, lower, value threshold value T is generated. By operation of the microprocessor 65, the new value is substituted for the previously existing value T in the register 48.

It is possible however that under the condition of enabling of output 66a of comparator 66, the counter 76 does not overflow. In this case, gate 74 is disabled and gate 90 is enabled. Then, tristate 64 is disabled and tristate 78 is enabled allowing output from register 48 to reach bus 80. Microprocessor 85 in this case reads the threshold value stored in register 48, directly, for transfer to bus 80. Thus, each time a new frame of PCM signals is processed, the threshold value held in register 48 will either be updated by replacing the value therein with a new value $x_i \cdot g_i$ representing a new, higher threshold or if the condition $T < x_i \cdot g_i$ prevails, the existing threshold will either be maintained (if counter 76 has not overflowed) or be reduced (if counter 76 overflows). The look-up table device 51 is preferably constructed, however, so that decrementation of the threshold value does not occur once a zero value is reached.

The counter 76 is provided in view of the fact that the threshold value stored in register 48 will normally be a 7 bit A-law coded PCM signal, and if that were directly acted on to effect decrementation of the value of "T" in register 48, undesired steps in the decrementation of the threshold value in the register would occur. In use counter 76 is preloaded to a predetermined count less than its full capacity. Outputs of tristates 81 and 82 are joined on a common input bus 84 to a look-up table 83.

When output 66b is enabled (i.e. when $T > x_i g_i$), tristate 81 is enabled; when output 66a is enabled (i.e. when $T < x_i g_i$), tristate 82 is enabled. The counter 76 is preloaded with the output of look-up table 83 (which output is in that case conditioned in a predetermined manner in accordance with the value "T" stored in register 48) whenever output 66a is enabled (i.e. when $T < x_i g_i$) or the counter overflows. The input of tristate 82 is connected to the register 40 and enabling of tristate 82 is effective to increment the count in counter 76 in a manner proportional to the value $x_i g_i$ then stored in register 40. Thus the number of enablings of output 66b necessary to produce an overflow from the counter 76 is dependent upon the magnitude of the stored values in register 48 and in register 40. In this regard, the look up table 83 may be constructed so as to effect preloading of counter 76 with a value which is in some manner inversely proportional to the value of "T" presented thereto. Then, since the output of the counter is enabled only at the overflow condition, the time taken for a decrementation of the stored threshold value to occur is correspondingly proportional to the magnitude of the stored threshold value. Similarly, each incrementation of the counter via tristate 82 from register 40 may be made by a value in some manner inversely proportional to the respective $x_i \cdot g_i$ value presented to the look up table 83.

The operation of the bridge can be described by the following alogrithm written in Pascal:
i:=Instant Speaker;
For n:=1 to Number of conferees do
   If (Xn*Gn>Xi*Gi) AND (Xn*Gn>Threshold*Gn)
    then i:=n; (1)
If Xi*Gi>Threshold Then threshold :=ABS (Xi*Gi);
If Threshold>0 Then
   Threshold:=Threshold - 1;
For n:=1 to Number of conferees do
   If n<>i Then Yn:=Xi*Gi;
Instant speaker:=i;

The described arrangement has been advanced merely by way of explanation and many modifications may be made thereto without departing from the spirit and scope of the invention as defined in the appended claims.

I claim:

1. A digital conference bridge whereby output signals from a plurality of communications devices can be controlled whereby the output signal from a selected one of the devices is directed to the remainder, the signal for the time being so selected being determined by selection means incorporated into said bridge and receiving time spaced digitized samples at least representing said signals, characterized in that said selection means comprises first generating means for generating the products $x_n \cdot g_n$, $x_i \cdot g_i$ where $x_n$ and $x_i$ are instantaneous magnitudes of the samples of all of the signals, and of the selected signal respectively and $g_n$ and $g_i$ are predetermined gain factors for all of the signals and for the selected signals; first store means for storing a threshold value "T"; first comparator means for comparing the products $x_n \cdot g_n$ with the product $x_i \cdot g_i$; switch means for routing the selected signal to each non-selected communications device; and control means responsive to the conditions $x_n \cdot g_n > x_i \cdot g_i$ and $x_n \cdot g_n > T \cdot g_n$ to control said switch means to supplant a selection of an existing said signal with a newly selected signal in accordance with that one of the previously non-selected signals which meets said conditions.

2. A digital conference bridge as claimed in claim 1, including updating means for updating said first store means, said updating means including a second comparator means for comparing a presently stored threshold value T in said first store means with products $x_i \cdot g_i$ and means for supplanting the existing threshold value by a new value equal to $x_i \cdot g_i$ in the event that a product $x_i \cdot g_i$ should exceed the existing threshold value, said updating means further including decrementing means coupled to said second comparator means for decrementing said threshold value T by a predetermined amount in the event that the threshold value T should exceed one or a plurality of successive products $x_i \cdot g_i$.

3. A digital conference bridge as claimed in claim 2 wherein said decrementing means is operated under control of a counter, means being provided for preloading the counter with a value at least derived from said threshold value T, and means being provided for incrementing the counter when the threshold value is found to exceed a product $x_i g_i$ whereby overflow of the counter occurs after one or a number of successive products $x_i g_i$ are exceeded by the threshold value T, said counter being coupled to means for modifying the threshold T stored in said first store means, on overflow of the counter.

4. A digital conference bridge as claimed in claim 3 wherein said control means includes a gain look up table having its input coupled to the output of the first store means for producing at the output of the gain look up table the product $T \cdot g_n$, a control comparator having inputs coupled respectively to receive the output of the gain look up table and to receive the products $x_n \cdot g_n$, gate means having inputs coupled to receive the output of said first comparator means and said control comparator, the output of said first comparator means and said control comparator being enabled when respectively $x_n \cdot g_n > x_i \cdot g_i$ and $x_n \cdot g_n > T \cdot g_n$ and said gate means being enabled when both of these outputs are enabled, but not otherwise, said gate means being coupled to an identification register to store a value "i" when the gate is enabled.

5. A digital conference bridge as claimed in claim 1 wherein said control means includes a gain look up table having its input coupled to the output of the first store means for producing at the output of the gain look up table the product $T \cdot g_n$, a control comparator having inputs coupled respectively to receive the output of the gain look up table and to receive the products $x_n \cdot g_n$, gate means having inputs coupled to receive the output of said first comparator means and said control comparator, the output of said first comparator means and said control comparator being enabled when respectively $x_n \cdot g_n > x_i \cdot g_i$ and $x_n \cdot g_n > T \cdot g_n$ and said gate means being enabled when both of these outputs are enabled, but not otherwise, said gate means being coupled to an identification register to store a value "i" when the gate is enabled.

6. A digital conference bridge as claimed in claim 2 wherein said control means includes a gain look up table having its input coupled to the output of the first store means for producing at the output of the gain look up table the product $T \cdot g_n$, a control comparator having inputs coupled respectively to receive the output of the gain look up table and to receive the products $x_n \cdot g_n$, gate means having inputs coupled to receive the output of said first comparator means and said control comparator, the output of said first comparator means and said control comparator being enabled when respectively $x_n \cdot g_n > x_i \cdot g_i$ and $x_n \cdot g_n > T \cdot g_n$ and said gate means being enabled when both of these outputs are enabled, but not otherwise, said gate means being coupled to an identification register to store a value "i" when the gate is enabled.

* * * * *